United States Patent
Yeh et al.

(10) Patent No.: US 7,098,973 B2
(45) Date of Patent: Aug. 29, 2006

(54) TRANSFLECTIVE LIQUID CRYSTAL DISPLAY USING TRANSFLECTIVE COLOR FILTER

(75) Inventors: Sheng-Shiou Yeh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 10/843,279

(22) Filed: May 10, 2004

(65) Prior Publication Data
US 2004/0223101 A1 Nov. 11, 2004

(30) Foreign Application Priority Data
May 9, 2003 (TW) ............... 92112727 A (51) Int. Cl.
*G02F 1/13* (2006.01)

(52) U.S. Cl. ........................ 349/106; 349/114

(58) Field of Classification Search ............... 349/106, 349/113, 114
See application file for complete search history.

(56) References Cited

U.S. PATENT DOCUMENTS 4,786,148 A * 11/1988 Sekimura et al. .......... 349/106
6,476,889 B1 * 11/2002 Urabe et al. ............... 349/106
6,522,377 B1    2/2003 Kim et al.
6,697,135 B1 *  2/2004 Baek et al. ................ 349/106

FOREIGN PATENT DOCUMENTS

JP    P2002-311227    10/2002

* cited by examiner

*Primary Examiner*—James A. Dudek
(74) *Attorney, Agent, or Firm*—Wei Te Chung (57) ABSTRACT

A color filter for a transflective liquid crystal display (LCD) includes a transparent substrate (2011), a color filter layer (2012) covering the transparent substrate, a transparent layer (2013) covering the color filter layer, and a transparent electrode (2014). The color filter layer comprises a plurality of black matrix units (2016) and a plurality of color units (2015). Each color unit has two first portions (r) that correspond to a reflective mode, and a second portion (t) that corresponds to a transmissive mode. The second portion is preferably twice as thick as the first portions. A transflective LCD using the color filter is also described.

2 Claims, 6 Drawing Sheets

TRANSFLECTIVE LIQUID CRYSTAL DISPLAY USING TRANSFLECTIVE COLOR FILTER

BACKGROUND OF THE INVENTION

1. Field of the Invention

The present invention relates to a liquid crystal display, and more particularly to a transflective liquid crystal display device.

2. Description of the Prior Art

Liquid crystal display (LCD) devices are in wide use as display devices capable of reducing the overall size, weight and thickness of electronic apparatuses in which they are employed. In general, LCD devices are divided into two categories—transmissive LCD devices and reflective LCD devices—according to whether the display uses an included or an external light source.

A transmissive LCD device displays images using light from a back light device, and is usable under any ambient light conditions. Because the transmissive LCD device requires a back light having high brightness, it has high power consumption. Further, the back light device cannot be used for a long time.

Unlike the transmissive LCD device, a reflective LCD device utilizes ambient light beams from a natural light source or from an external artificial light source. The reflective LCD device can be used for a long time. However, the reflective LCD device is useless when the weather is unfavorable or when the external light source is not available.

To overcome the problems described above, a transflective LCD device has been developed. The transflective LCD device can compensate for the respective shortcomings of the reflective LCD device and the transmissive LCD device. That is, the transflective LCD device can selectively provide a reflective or transmissive mode, depending on the needs of users.

Figure 8:
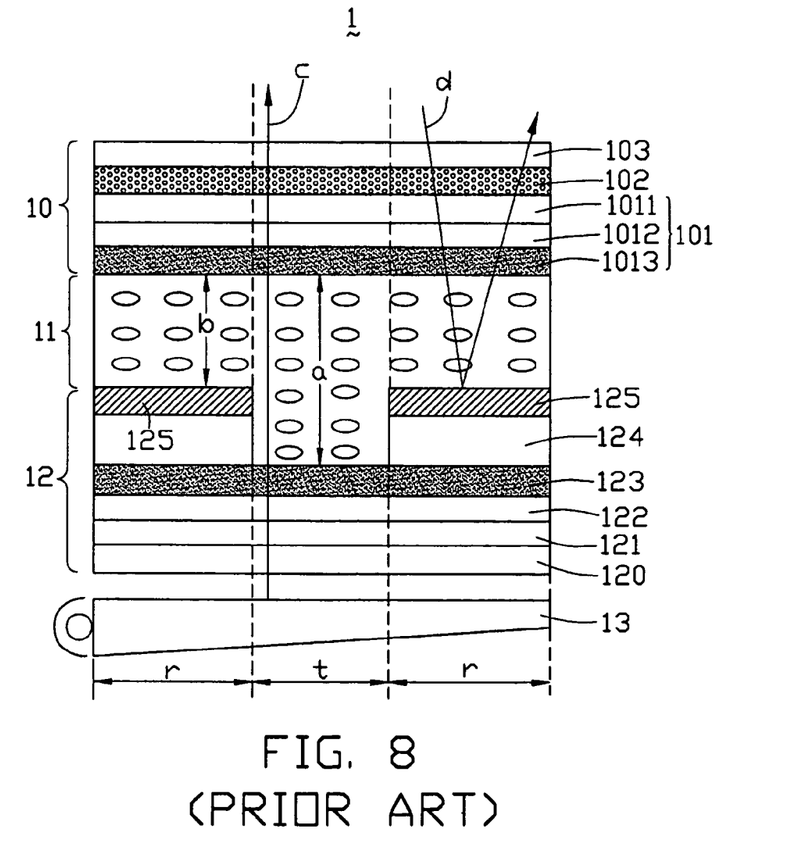
FIG. 8 is a schematic, cross-sectional view of part of a conventional transflective liquid crystal display device.

FIG. 8 is a partial cross-sectional view illustrating a conventional transflective LCD device 1. For the sake of convenience, just one sub-pixel portion of the transflective LCD device 1 is shown. The transflective LCD device 1 includes an upper plate 10 having a color filter 101, a lower plate 12 spaced apart from the upper plate 10, a liquid crystal layer 11 between the upper plate 10 and the lower plate 12, and a back light 13 disposed below the lower plate 12.

Figure 9:
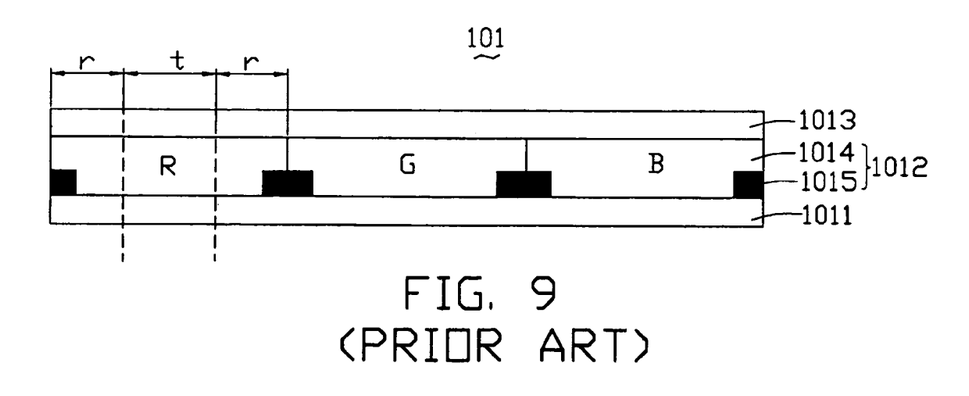
FIG. 9 is an enlarged, schematic, cross-sectional view of a color filter of the transflective liquid crystal display device of FIG. 8, but showing the color filter inverted.

Referring also to FIG. 9, in the transflective LCD device 1, a conventional color filter 101 is employed. The color filter 101 includes an upper transparent substrate 1011, a color filter layer 1012, and a transparent electrode 1013. The color filter layer 1012 includes a plurality of black matrix units 1015 regularly disposed on the upper transparent substrate 1011, and color units 1014 covering the black matrix units 1015. The color units 1014 are divided into R, G and B color units. In the upper plate 10, the color filter layer 1012 is formed on a bottom surface of the transparent substrate 1011, and the upper transparent electrode 1013 is formed on the color filter layer 1012. The upper transparent electrode 1013 serves as a common electrode. In addition, a half wave plate 102 is formed as a retardation film on a top surface of the transparent substrate 1011, and an upper polarizer 103 is formed on the half wave plate 102.

In the lower plate 12, an insulating layer 122 is formed on a top surface of a lower transparent substrate 121, and a lower transparent electrode 123 is formed on the insulating layer 122. A passivation layer 124 is formed on the lower transparent electrode 123, and a reflective electrode 125 is formed on the passivation layer 124. A transmitting hole (not labeled) is defined through the passivation layer 124 and the reflective electrode 125. A lower polarizer 120 is formed on a bottom surface of the lower transparent substrate 121.

The transflective LCD device 1 has a transmissive portion "t" that corresponds to a portion of the lower transparent electrode 123 exposed via the transmitting hole, and a pair of reflective portions "r" that correspond to the reflective electrode 125. The transmissive portion "t" has a first cell gap "a" between the upper transparent electrode 1013 and the lower transparent electrode 123. The reflective portions "r" have a second cell gap "b" between the upper transparent electrode 1013 and the reflective electrode 125. The first cell gap "a" is configured to be larger than the second cell gap "b," such that incident light rays have the same efficiency for the transmissive and reflective modes. Specifically, the first cell gap "a" is preferably about twice as large as the second cell gap "b."

In the reflective mode, an ambient light ray "d" from an external light source such as natural sunlight passes through the upper polarizer 103, the half wave plate 102, the color filter 101 and the liquid crystal layer 11 in that order, and is then reflected by the reflective electrode 125 to pass back through the liquid crystal layer 11, the color filter 101, the half wave plate 102 and the upper polarizer 103 in that order. That is, the ambient light ray "d" passes through the color filter 101 twice.

In the transmissive mode, an incident light ray "c" from the back light 13 passes through the lower polarizer 120, the transparent substrate 121, the insulating layer 122, the lower transparent electrode 123, the liquid crystal layer 11, the color filter 101, the half wave plate 102 and the upper polarizer 103 in that order. That is, the incident light ray "c" passes through the color filter 101 only once.

The light ray "c" is only colored once by the color filter 101 in the transmissive mode, but the light ray "d" is colored twice by the color filter 101 in the reflective mode. Thus, in the transflective LCD device 1, the reflective mode has a better color purity than the transmissive mode. That is, there is a difference in color purity as between the reflective mode and the transmissive mode.

For the above reason, an improved transflective LCD having high color purity is desired.

SUMMARY OF THE INVENTION

An object of the invention is to provide a color filter for a transflective liquid crystal display which has high color purity.

Another object of the invention is to provide a transflective liquid crystal display device having high color purity.

A further object of the invention is to provide a method for fabricating a color filter for a transflective LCD device, in which the color filter has high color purity.

In order to achieve the objects set forth above, the present invention provides a transflective liquid crystal display device which includes: an upper plate having a color filter and a lower plate having the lower transparent electrodes and reflective electrodes; a liquid crystal layer interposed between the upper and lower plate; and a back light disposed below the lower plate. Each color unit of the color filter includes a first portion and a second portion, with the second portion being thicker than the first portion. Specifically, the second portion is twice as thick as the first portion. The first portion of each color unit corresponds to a respective reflective electrode, and the second portion of each color unit corresponds to a respective lower transparent electrode.

In the transmissive mode, an incident light ray passes through the color filter only once. In the reflective mode, an ambient light ray passes through the color filter twice. In the transmissive mode, the thickness of the color unit where the incident light ray passes therethrough once is twice the thickness of the color unit where the ambient light ray passes therethrough twice in the reflective mode. That is, there is identical color purity as between the reflective mode and the transmissive mode.

Further, the present invention provides a method for fabricating a color filter for a transflective LCD device, the method comprising: providing a substrate; forming a black matrix on the substrate; repeatedly depositing and patterning a plurality of color resins on the substrate where the black matrix is formed such that red, green, and blue color units are formed, each color unit having two first portions that correspond to a reflective mode and a second portion that corresponds to a transmissive mode, the second portion being approximately twice as thick as the first portions; depositing and patterning a transparent insulating material on bottommost portions of the color units to form a uniform surface such that a transparent layer is formed; and forming an upper transparent electrode on the substrate where the color units are formed.

Other objects, advantages and novel features of the invention will become more apparent from the following detailed description of preferred embodiments of the invention as illustrated in the accompanying drawings, in which:

BRIEF DESCRIPTION OF THE INVENTION

DETAILED DESCRIPTION OF THE INVENTION

Reference will be made to the drawings to describe the invention in detail.

Figure 1:
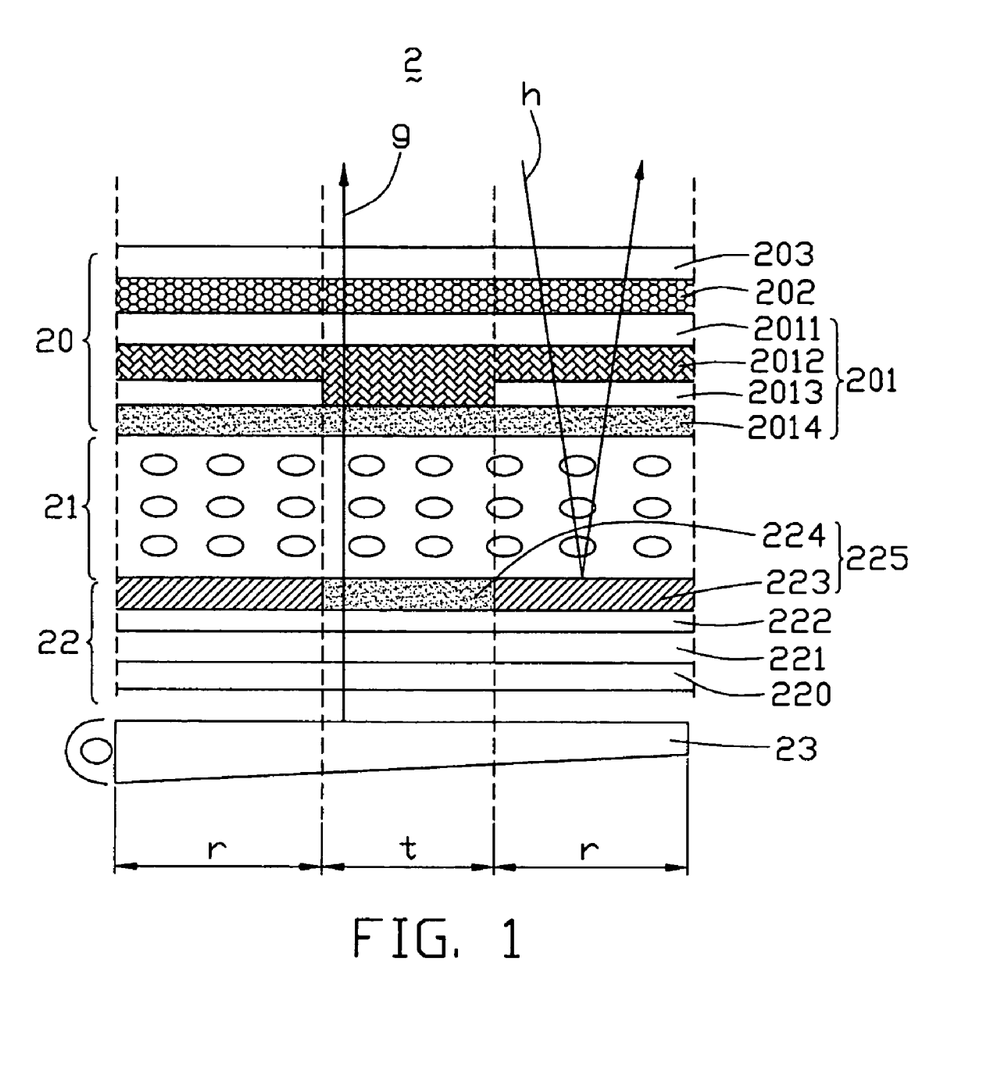
FIG. 1 is a schematic, cross-sectional view of part of a first embodiment of a transflective liquid crystal display device according to the present invention.

FIG. 1 illustrates a transflective liquid crystal display (LCD) device 2 according to the first embodiment of the present invention. For the sake of convenience, just one sub-pixel of the transflective LCD device 2 is shown. The transflective LCD device 2 includes an upper plate 20, a lower plate 22, a liquid crystal layer 21 interposed therebetween, and a back light 23 disposed below the lower plate 22.

Figure 2:
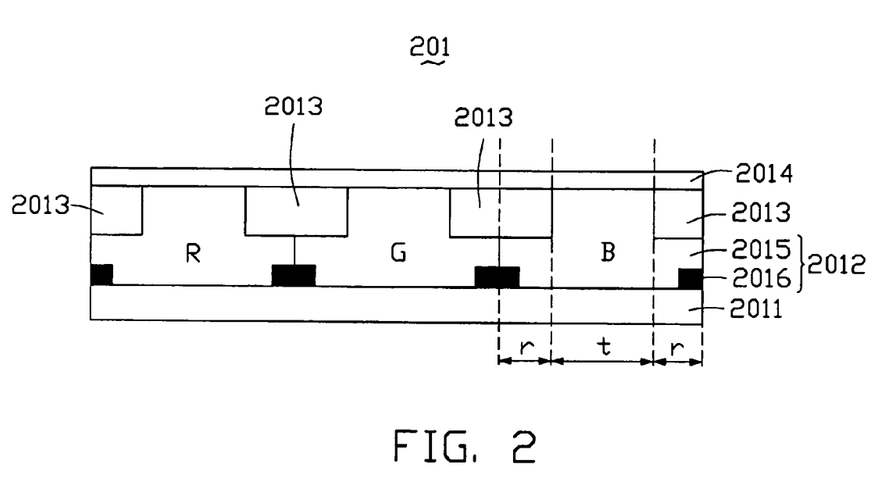
FIG. 2 is an enlarged, schematic, cross-sectional view of a first color filter of the transflective liquid crystal display device of FIG. 1, but showing the first color filter inverted.

In the upper plate 20, a first color filter 201, a half wave plate 202 and an upper polarizer 203 are stacked sequentially. Referring to FIG. 2, for the sake of convenience, just one pixel of the first color filter 201 is shown. In general, one pixel comprises three sub-pixels. The first color filter 201 includes a transparent substrate 2011, a color filter layer 2012, a transparent layer 2013, and an upper transparent electrode layer 2014. The color filter layer 2012 is formed on a bottom surface (not labeled) of the transparent substrate 2011, and includes a plurality of black matrix units 2016 and a plurality of color units 2015. Each black matrix unit 2016 serves to protect a thin film transistor (not shown) from being irradiated by incident light rays. In addition, the black matrix unit 2016 serves to prevent leakage of the incident light through intervals between electrical lines formed on the lower plate 22. Each color unit 2015 has two first portions "r" and a second portion "t" between the first portions "r." The second portion "t" of each color unit 2015 is preferably twice as thick as the first portions "r" of each color unit 2015. The upper transparent electrode 2014 is formed on the color filter layer 2011 and serves as a common electrode. The transparent layer 2013 serves to fill gaps between the color unit 2015 and the upper transparent electrode 2014. In the upper plate 20, the half wave plate 202 is formed as a retardation film on a top surface of the transparent substrate 2011, and the upper polarizer 203 is formed on the half wave plate 202.

The lower plate 22 includes a transparent substrate 221, an insulating layer 222, a lower electrode layer 225, and a lower polarizer 220. The insulating layer 222 is formed on a top surface of the transparent substrate 221. The lower electrode layer 225 comprises lower transparent electrodes 224 and reflective electrodes 223 alternately formed in a single plane on the insulating layer 222. The lower transparent electrodes 224 are preferably made of a transparent conductive material. The reflective electrodes 223 are made of an opaque metal having a high reflectivity, such as aluminum (Al) or the like. The lower polarizer 220 is formed on a bottom surface of the transparent substrate 221.

In the transflective LCD device 2, each first portion "r" of each color unit 2015 corresponds to one reflective electrode 223, and the second portion "t" of each color unit 2015 corresponds to one lower transparent electrode 224.

In a transmissive mode, an incident light ray "g" from the back light 23 passes through the lower polarizer 220, the transparent substrate 221, the insulating layer 222, the lower transparent electrode 224, the liquid crystal layer 21, the first color filter 201, the half wave plate 202 and the upper polarizer 203 in that order.

In a reflective mode, an ambient light ray "h" from an external light source such as natural sunlight passes through the upper polarizer 203, the half wave plate 202, the first color filter 201 and the liquid layer 21 in that order, and is then reflected by the reflective electrode 223 to pass back through the liquid layer 21, the first color filter 201, the half wave plate 202 and the upper polarizer 203 in that order.

In the transmissive mode, the incident light ray "g" passes through the first color filter 201 only once, and in the reflective mode the ambient light ray "h" passes through the first color filter 201 twice. The thickness of the color unit 2015 where the incident light ray "g" passes therethrough is twice the thickness of the color unit 2015 where the ambient light ray "h" passes therethrough. That is, there is identical color purity as between the reflective mode and the transmissive mode.

Figure 3:
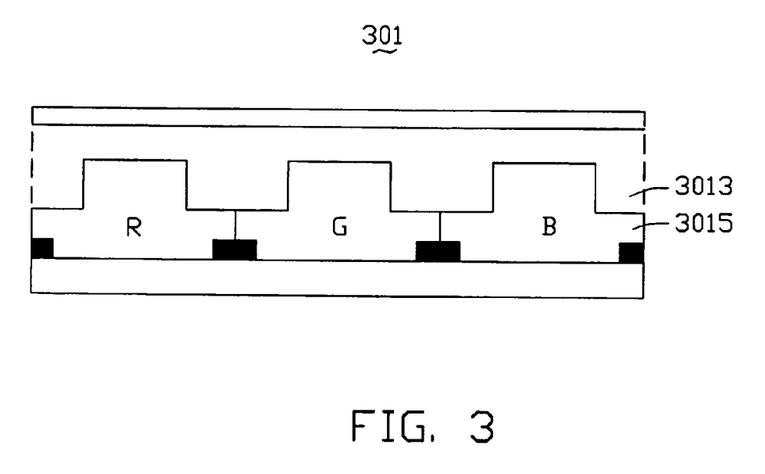
FIG. 3 is a schematic, cross-sectional, inverted view of part of a second color filter of a transflective liquid crystal display device according to a second embodiment of the present invention.

FIG. 3 shows a second color filter 301 of a transflective liquid crystal display device according to a second embodiment of the present invention. The second color filter 301 is similar to the first color filter 201 of the first embodiment, except that a transparent layer 3013 completely underlays a plurality of color units 3015.

Figure 4:
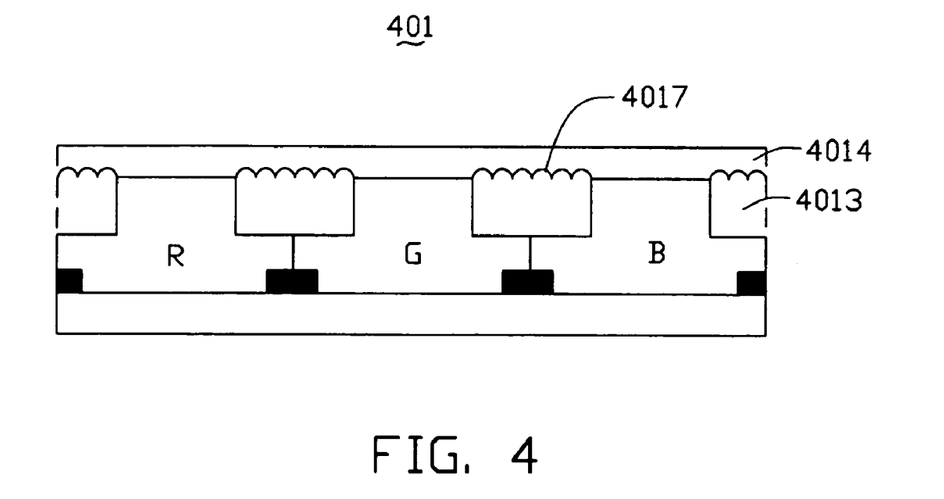
FIG. 4 is a schematic, cross-sectional, inverted view of part of a third color filter of a transflective liquid crystal display device according to a third embodiment of the present invention.

FIG. 4 shows a third color filter 401 of a transflective liquid crystal display device according to a third embodiment of the present invention. The third color filter 401 is similar to the first color filter 201 of the first embodiment, except that a plurality of convex protrusions 4017 is formed on bottom surfaces (not labeled) of a transparent layer 4013. The convex protrusions 4017 are elongate and parallel to each other, and can readily gather incident light rays from different directions. A lower transparent layer 4014 adjoins undersides of the convex protrusions 4017.

Figure 5:
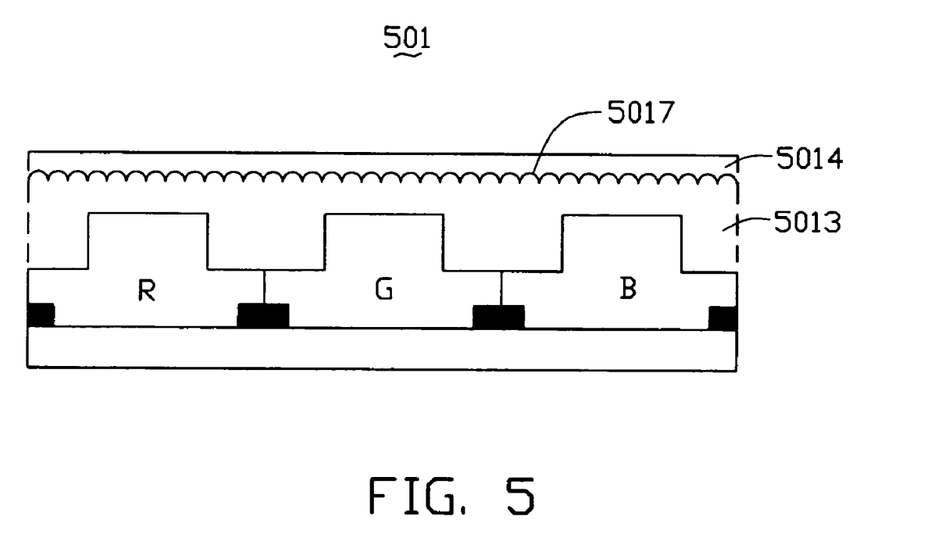
FIG. 5 is a schematic, cross-sectional, inverted view of part of a fourth color filter of a transflective liquid crystal display device according to a fourth embodiment of the present invention.

FIG. 5 shows a fourth color filter 501 of a transflective liquid crystal display device according to a fourth embodiment of the present invention. The fourth color filter 501 is similar to the second color filter 301 of the second embodiment, except that a plurality of convex protrusions 5017 is formed on a bottom surface (not labeled) of a transparent layer 5013. The convex protrusions 5017 are elongate and parallel to each other, and can readily gather incident light rays from different directions. A lower transparent layer 5014 adjoins undersides of the convex protrusions 5017.

A preferred method for fabricating the first color filter 201 is provided as follows. First the black matrix units 2016 are regularly formed on the transparent substrate 2011. Each black matrix unit 2016 is preferably a single layer made of chromium (Cr), or alternatively a double-layer including a chromium (Cr) layer and a chromium oxide ($CrO_x$) layer. To fabricate the black matrix units 2016, a light-shielding material is deposited on the substrate 2011. Then, an opaque metal having a low reflectivity is deposited on the light-shielding material preferably using a known sputtering technique, and a photoresist layer is formed on the opaque metal. A positive photoresist is preferably used. Then the photoresist layer is exposed and developed, and the opaque metal is patterned such that the black matrix units 2016 are formed.

Second, the color units 2015 are formed on the transparent substrate 2011. To fabricate red color units 2015, a viscous resin admixed with a red dye is deposited on the transparent substrate 2011 where corresponding black matrix units 2016 are formed. Then the resin is exposed using a color-resist, and developed such that red color units "R" are formed. A negative color-resist is preferably used for the exposing procedure. Alternatively, if a photosensitive resin is selected as the viscous resin, no color-resist is needed for the exposing procedure. After the red color units "R" are formed, green color units "G" and blue color units "B" are sequentially formed by repeating the above-described procedures, with due alteration of details. Furthermore, each color unit 2015 has the two first portions "r" that correspond to a respective pair of reflective electrodes 223, and the second portion "t" that corresponds to a respective lower transparent electrode 224. The second portion "t" is twice as thick as the first portions "r."

Third, the transparent layer 2013 is formed on the color units 2015. To fabricate the transparent layer 2013, a transparent insulating material is deposited and patterned on the inmost portions of the color units 2015. That is, gaps between bottommost portions of the color units 2015 are filled, such that the transparent layer 2013 and the bottommost portions of the color units 2015 cooperatively form a uniform plane surface.

Finally, the upper transparent electrode 2014 is formed. Preferably, a transparent conductive material is deposited on said uniform plane surface, thereby forming the upper transparent electrode 2014. That is, the upper transparent electrode 2014 is formed without any etching step.

Figure 6:
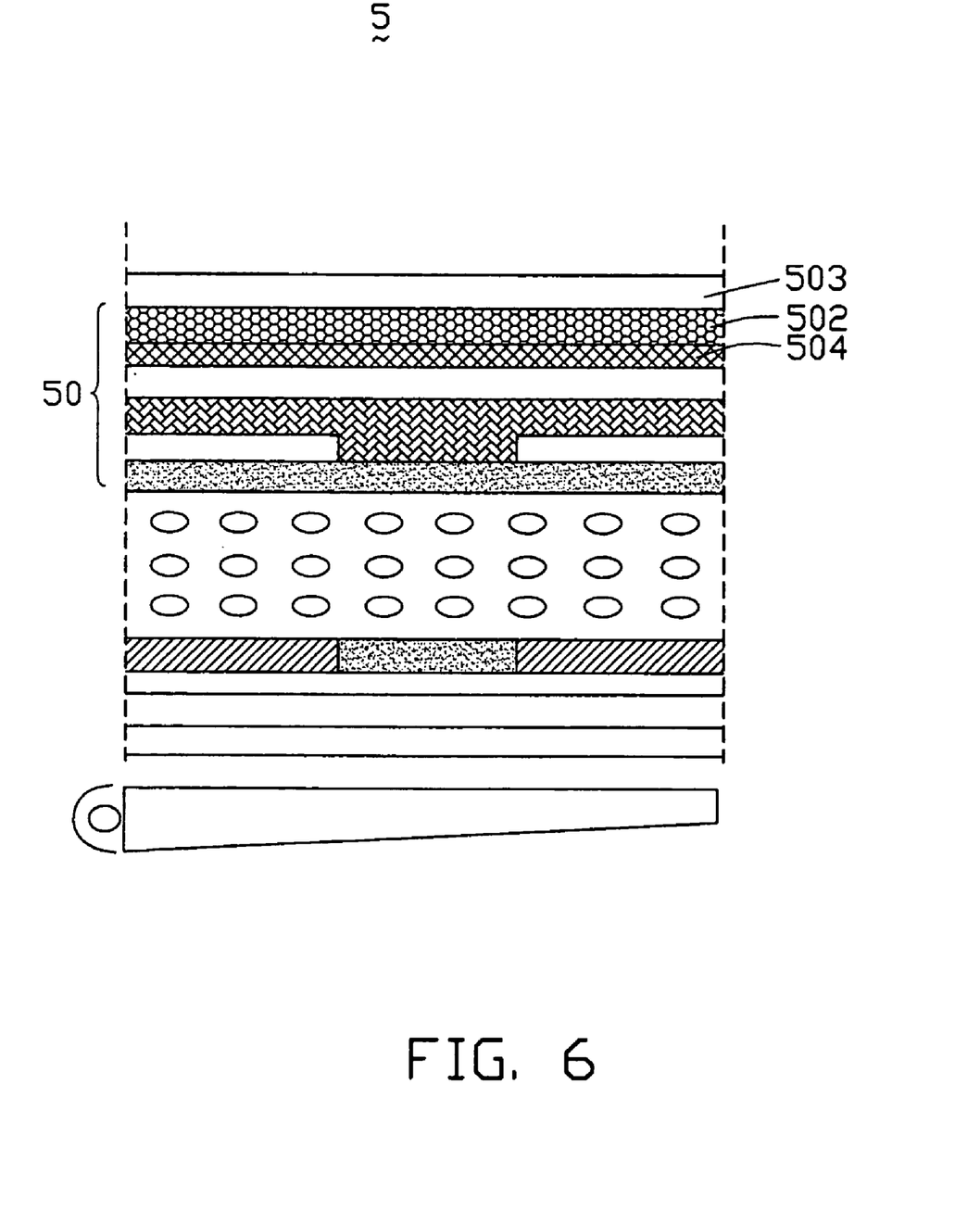
FIG. 6 is a schematic, cross-sectional view of part of a fifth embodiment of a transflective liquid crystal display device according to the present invention.

FIG. 6 shows a transflective LCD device 5 of a fifth embodiment of the present invention. The transflective LCD device 5 is similar to the transflective LCD device 2 of the first embodiment except that in an upper plate 50, a quarter wave plate 502 is interposed between an upper polarizer 503 and a half wave plate 504. The quarter wave plate 502 provides a phase difference of "$\lambda/4$" such that incident linearly polarized light rays are changed to circularly polarized light rays when they pass therethrough.

Figure 7:
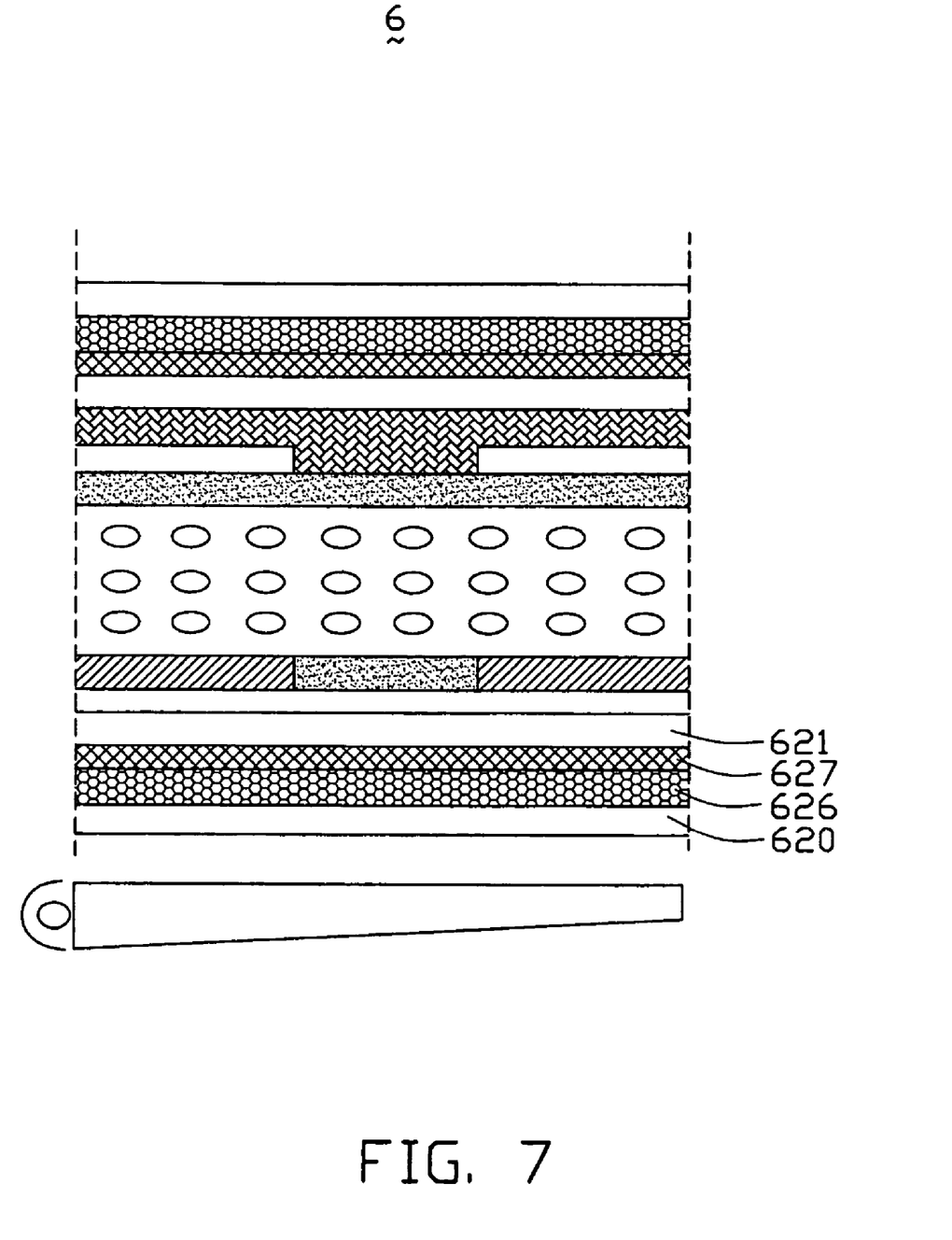
FIG. 7 is a schematic, cross-sectional view of part of a sixth embodiment of a transflective liquid crystal display device according to the present invention.

FIG. 7 shows a transflective LCD device 6 of a sixth embodiment of the present invention. The transflective LCD device 6 is similar to the transflective LCD device 2 of the first embodiment, except that a half wave plate 626 and a quarter wave plate 627 are interposed between a lower polarizer 620 and a lower transparent substrate 621.

It will be appreciated that in further embodiments of the present invention, any of the color filters 201, 301, 401, 501 can be used in either of the transflective LCD devices 6, 7.

The color filters 201, 301, 401, 501 have a common feature. That is, each color unit (e.g. 2015, 3015) has two first portions "r" and a second portion "t", with the second portion "t" preferably being twice as thick as the first portions "r". In the transflective LCD employing the color filters 201, 301, 401, 501, each first portion "r" of each color unit (e.g. 2015, 3015) corresponds to a respective reflective electrode 223, and the second portion "t" of each color unit (e.g. 2015, 3015) corresponds to a respective lower transparent electrode 224.

In the transmissive mode, the incident light ray ("g" in FIG. 1) passes through the color filter 201, 301, 401, 501 only once, and in the reflective mode the ambient light ray ("h" in FIG. 1) passes through the color filter 201, 301, 401, 501 twice. In the transmissive mode, the thickness of the color unit (e.g. 2015, 3015) where the incident light ray "g" passes through is twice as great as the thickness of the color unit (e.g. 2015, 3015) where the ambient light ray "h" passes through. Thus, there is identical color purity as between the reflective mode and the transmissive mode.

It is to be understood, however, than even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the extent indicated by the broad general meaning of the terms in which the appended claims are expressed.

What is claimed is:

1. A transflective liquid crystal display device comprising:
an upper plate having a color filter, a half wave plate and an upper polarizer;
a lower plate having a transparent substrate, an insulating layer formed on a top surface of the transparent substrate, a lower electrode layer comprising lower transparent electrodes and reflective electrodes alternately formed on the insulating layer, and a lower polarizer formed on a bottom surface of the transparent substrate; and a liquid crystal layer interposed between the upper plate and the lower plate;

wherein the color filter comprises a transparent substrate, a color filter layer covering the transparent substrate, and a transparent layer covering the color filter layer and comprising a plurality of convex protrusions formed on one or more bottom surfaces thereof, and the color filter layer further comprises a plurality of black matrix units and a plurality of color units, each color unit having a first portion and a second portion, the second portion being thicker than the first portion, the first portion of each color unit corresponding to a respective reflective electrode, the second portion of each color unit corresponding to a respective lower transparent electrode; wherein the transparent layer serves to fill gaps between the color units and the upper transparent electrode of the upper substrate; wherein the transparent layer further comprises a plurality of convex protrusions formed on bottom surfaces thereof.

2. A color filter for a transflective liquid crystal display, comprising:

a transparent substrate;

a color filter layer covering the transparent substrate; and a transparent layer covering the color filter layer, the transparent layer comprising a plurality of convex protrusions formed on one or more bottom surfaces thereof;

wherein the color filter layer comprises a plurality of black matrix units and a plurality of color units, each color unit has a first portion that corresponds to a reflective mode and a second portion that corresponds to a transmissive mode, and the second portion is thicker than the first portion, wherein the transparent layer serves to fill gaps between the color units and the upper transparent electrode of the upper substrate; wherein the transparent layer further comprises a plurality of convex protrusions formed on a bottom surface thereof.

* * * * *